US012223896B2

(12) United States Patent
Park et al.

(10) Patent No.: US 12,223,896 B2
(45) Date of Patent: Feb. 11, 2025

(54) DISPLAY DEVICE AND METHOD OF DRIVING THE SAME

(71) Applicant: Samsung Display Co., Ltd., Yongin-si (KR)

(72) Inventors: Subin Park, Hwaseong-si (KR); Soyoung Kim, Yongin-si (KR); Jungkook Park, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/113,296

(22) Filed: Feb. 23, 2023

(65) Prior Publication Data

US 2023/0306907 A1 Sep. 28, 2023

(30) Foreign Application Priority Data

Mar. 28, 2022 (KR) ........................ 10-2022-0038139

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0465* (2013.01); *G09G 2300/0842* (2013.01); *G09G 2310/08* (2013.01); *G09G 2320/0233* (2013.01)

(58) Field of Classification Search
CPC ............... G09G 3/3233; G09G 3/3291; G09G 2300/0465; G09G 2300/0842; G09G 2310/08; G09G 2320/0233; G09G 3/3225; G09G 2300/0819; G09G 2300/0852; G09G 2300/0861; G09G 2300/043; G09G 2300/0809; G09G 2320/043; G09G 2320/045; G09G 5/10
See application file for complete search history.

(56) References Cited

U.S. PATENT DOCUMENTS

2012/0001896 A1* 1/2012 Han ..................... G09G 3/3233 345/76
2013/0321485 A1* 12/2013 Eom .................... G09G 3/3208 345/82
2019/0295469 A1* 9/2019 Umezawa ............ G09G 3/3241

FOREIGN PATENT DOCUMENTS

KR 100686334 B1 2/2007
KR 1020200111864 A 10/2020
KR 1020210004007 A 1/2021
KR 1020210013509 A 2/2021

* cited by examiner

*Primary Examiner* — Stephen G Sherman
(74) *Attorney, Agent, or Firm* — CANTOR COLBURN LLP

(57) ABSTRACT

A display device includes a display panel including pixels, and a timing controller which determines a first dimming period and a second dimming period based on a maximum luminance, determines an emission off ratio of the pixels as a first off ratio increasing discretely as the maximum luminance decreases in the first dimming period, and determines the emission off ratio as a second off ratio in the second dimming period.

20 Claims, 8 Drawing Sheets

DISPLAY DEVICE AND METHOD OF DRIVING THE SAME

This application claims priority to Korean Patent Application No. 10-2022-0038139, filed on Mar. 28, 2022, and all the benefits accruing therefrom under 35 U.S.C. § 119, the content of which in its entirety is herein incorporated by reference.
21c 21c1378US

BACKGROUND

1. Field

Embodiments of the invention relate to a display device and a method of driving the display device. More particularly, embodiments of the invention relate to a display device determining an emission off ratio based on a maximum luminance and a method of driving the display device.

2. Description of the Related Art

Generally, a display device may include a display panel, a timing controller, a gate driver, and a source driver. The display panel may include a plurality of gate lines, a plurality of data lines, and a plurality of pixels electrically connected to the gate lines and the data lines. The gate driver may provide gate signals to the gate lines. The source driver may provide data voltages to the data lines. The timing controller may control the gate driver and the source driver.

SUMMARY

In a conventional display device, luminance may be adjusted by adjusting only data voltages applied to the pixels. However, when the luminance is adjusted by adjusting only the data voltages, a current deviation may occur between the pixels due to a low current at low luminance (or low grayscale), and panel mural or the like may occur due to the current deviation. Accordingly, a display device may determine dimming period based on the maximum luminance and adjust an emission off ratio, e.g., AMOLED Off Ratio (AOR), in each of the dimming periods. However, as the AOR is varied, a luminance inversion phenomenon at low luminance (i.e., a phenomenon in which luminance increases even though the maximum luminance is lower) may occur.

Embodiments of the invention provide a display device that discretely adjusts an emission off ratio.

Embodiments of the invention also provide a method of driving the display device.

According to embodiments of the invention, a display device includes a display panel including pixels, and a timing controller which determines a first dimming period and a second dimming period based on a maximum luminance, determines an emission off ratio of the pixels as a first off ratio increasing discretely as the maximum luminance decreases in the first dimming period, and determines the emission off ratio as a second off ratio in the second dimming period.

In an embodiment, the maximum luminance of the first dimming period may be less than the maximum luminance of the second dimming period.

In an embodiment, the first off ratio may be greater than or equal to the second off ratio.

In an embodiment, the second off ratio may have a fixed value.

In an embodiment, the timing controller may determine the emission off ratio as the first off ratio in a first period of the first dimming period, and to determine the emission off ratio as a linear off ratio increasing linearly as the maximum luminance decreases in a second period of the first dimming period.

In an embodiment, the maximum luminance of the first period may be less than the maximum luminance of the second period.

In an embodiment, the linear off ratio may be less than or equal to the first off ratio and greater than or equal to the second off ratio.

In an embodiment, the first off ratio may increase linearly as the maximum luminance decreases except for a discretely increasing point.

In an embodiment, each of the pixels may include a light emitting element, a driving transistor which generates a driving current, a first emission transistor which applies a first power voltage to the driving transistor in response to an emission signal, a second emission transistor which applies the driving current to the light emitting element in response to the emission signal, a first initialization transistor which applies a first initialization voltage to an anode electrode of the light emitting element in response to the emission signal, a data write transistor which applies a data voltage to the driving transistor in response to a write gate signal, a compensation transistor which connects a first electrode of the driving transistor and a control electrode of the driving transistor to each other in response to a compensation gate signal, a second initialization transistor which applies a second initialization voltage to the control electrode of the driving transistor in response to an initialization gate signal, a storage capacitor including a first electrode connected to the control electrode of the driving transistor and a second electrode which receives the first power voltage, and a boost capacitor including a first electrode which receives the write gate signal and a second electrode connected to the control electrode of the driving transistor.

In an embodiment, an off duty ratio of the emission signal may be determined as the emission off ratio.

In an embodiment, the timing controller may determine a third dimming period based on the maximum luminance, and to determine the emission off ratio as a third off ratio in the third dimming period.

In an embodiment, the maximum luminance of the third dimming period may be less than the maximum luminance of the first dimming period.

In an embodiment, the third off ratio may be greater than or equal to the first off ratio.

In an embodiment, the third off ratio may have a fixed value.

According to embodiments of the invention, a method of driving a display device includes determining a first dimming period, a second dimming period, and a third dimming period based on a maximum luminance, determining an emission off ratio of pixels as a first off ratio increasing discretely as the maximum luminance decreases in the first dimming period, determining the emission off ratio as a second off ratio in the second dimming period, and determining the emission off ratio as the third off ratio in the third dimming period.

In an embodiment, the maximum luminance of the first dimming period may be less than the maximum luminance of the second dimming period, and the maximum luminance of the third dimming period may be less than the maximum luminance of the first dimming period.

In an embodiment, the first off ratio may be greater than or equal to the second off ratio, and the third off ratio may be greater than or equal to the first off ratio.

In an embodiment, the determining the emission off ratio in the first dimming period may include determining the emission off ratio as the first off ratio in a first period of the first dimming period, and determining the emission off ratio as a linear off ratio increasing linearly as the maximum luminance decreases in a second period of the first dimming period.

In an embodiment, the maximum luminance of the first period may be less than the maximum luminance of the second period.

In an embodiment, the linear off ratio may be less than or equal to the first off ratio and greater than or equal to the second off ratio.

In embodiments of the invention, the display device may discretely adjust an emission off ratio by determining a first dimming period and a second dimming period based on a maximum luminance, determining the emission off ratio of the pixels as a first off ratio increasing discretely as the maximum luminance decreases in the first dimming period, and determining the emission off ratio as a second off ratio in the second dimming period.

In such embodiments, the display device may reduce luminance inversion occurring in a variable period of an emission off ratio by discretely adjusting the emission off ratio.

However, the effects of the invention are not limited to the above-described effects, and may be variously expanded without departing from the spirit and scope of the invention.

DETAILED DESCRIPTION

Figure 1:
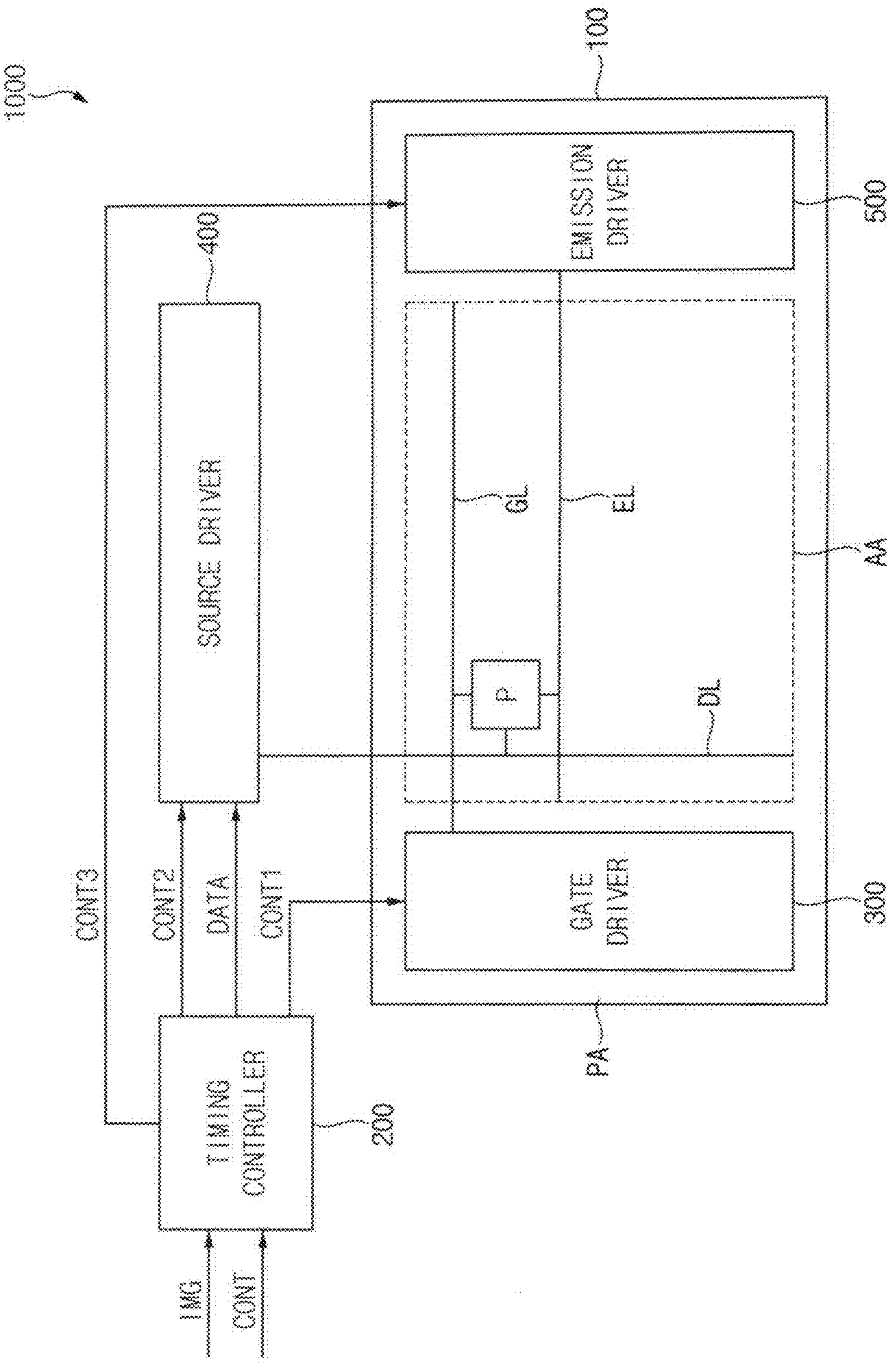
FIG. 1 is a block diagram illustrating a display device according to embodiments of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device 1000 according to embodiments of the invention.

Referring to FIG. 1, an embodiment of the display device 1000 may include a display panel 100, a timing controller 200, a gate driver 300, a source driver 400, and a emission driver 500. In an embodiment, the timing controller 200 and the source driver 400 may be integrated into (or defined by portions of) a single chip.

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, a plurality of emission lines EL and a plurality of pixels P electrically connected to the data lines DL, the gate lines GL, and the emission lines EL. The gate lines GL and the emission lines EL may extend in a first direction D1 and the data lines DL may extend in a second direction D2 crossing the first direction D1.

The timing controller 200 may receive input image data IMG and an input control signal CONT from a host processor (e.g., a graphic processing unit (GPU)). In an embodiment, for example, the input image data IMG may include red image data, green image data and blue image data. In such an embodiment, the input image data IMG may further include white image data. In an alternative embodiment, for example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, a third control signal CONT3, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the source driver 400 based on the input control signal CONT and output the second control signal CONT2 to the source driver 400. The second control signal CONT2 may include a horizontal start signal and a load signal.

The timing controller 200 may generate the third control signal CONT3 for controlling operation of the emission driver 500 based on the input control signal CONT and output the third control signal CONT3 to the emission driver 500. The third control signal CONT3 may include a vertical start signal and a emission clock signal.

The timing controller 200 may receive the input image data IMG and the input control signal CONT, and generate the data signal DATA. The timing controller 200 may output the data signal DATA to the source driver 400.

The gate driver 300 may generate gate signals for driving the gate lines GL in response to the first control signal CONT1 input from the timing controller 200. The gate driver 300 may output the gate signals to the gate lines GL. In an embodiment, for example, the gate driver 300 may sequentially output the gate signals to the gate lines GL.

The source driver 400 may receive the second control signal CONT2 and the data signal DATA from the timing controller 200. The source driver 400 may convert the data signal DATA into data voltages having an analog type. The source driver 400 may output the data voltage to the data lines DL.

The emission driver 500 may generate emission signals for driving the emission lines EL in response to the third control signal CONT3 input from the timing controller 200. The emission driver 500 may output the emission signals to the emission lines EL. In an embodiment, for example, the emission driver 500 may sequentially output the emission signals to the emission lines EL.

Figure 2:
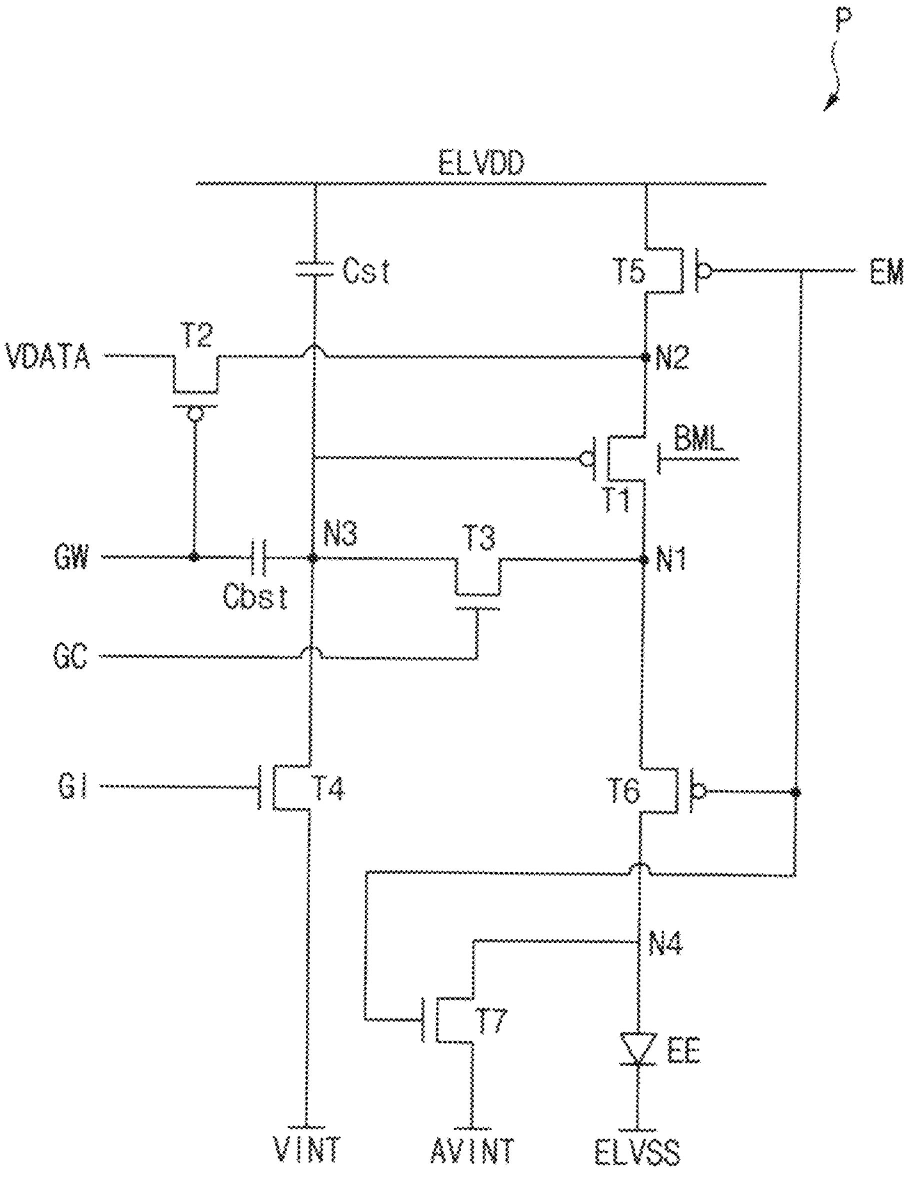
FIG. 2 is a circuit diagram illustrating an embodiment of a pixel of the display device of FIG. 1.

FIG. 2 is a circuit diagram illustrating an embodiment of a pixel of the display device of FIG. 1.

Referring to FIG. 2, in an embodiment, each of the pixels P may include a light emitting element EE, a driving transistor T1 that generates a driving current, a first emission transistor T5 that applies a first power voltage ELVDD to the driving transistor T1 in response to an emission signal EM, a second emission transistor T6 that applies the driving current to the light emitting element EE in response to the emission signal EM, a first initialization transistor T7 that applies a first initialization voltage VAINT to an anode electrode (i.e., a fourth node N4) of the light emitting element EE in response to the emission signal EM, a data write transistor T2 that applies the data voltage VDATA to the driving transistor T1 in response to a write gate signal GW, a compensation transistor T3 that connected a first electrode (i.e., a first node N1) of the driving transistor T1 and a control electrode (i.e., a third node N3) of the driving transistor T1 to each other in response to a compensation gate signal GC, a second initialization transistor T4 that applies a second initialization voltage VINT to the control electrode of the driving transistor T1 in response to an initialization gate signal GI, and a storage capacitor CST including a first electrode connected to the control electrode of the driving transistor T1 and a second electrode that receives the first power voltage ELVDD. In an embodiment, each of the pixels may further include a boost capacitor Cbst including a first electrode that receives the write gate signal GW and a second electrode connected to the control electrode of the driving transistor T1.

In an embodiment, for example, the driving transistor T1 may include a first electrode connected to the first node N1, a second electrode connected to a second node N2, and a control electrode connected to the third node N3, the first emission transistor T5 may include a first electrode connected to the second node N2, a second electrode that receives the first power voltage ELVDD, and a control electrode that receives the emission signal EM, the second emission transistor T6 may include a first electrode connected to the fourth node N4, a second electrode connected to the first node N1, and a control electrode that receives the emission signal EM, the first initialization transistor T7 may include a first electrode that receives the first initialization voltage VAINT, a second electrode connected to the fourth node N4, and a control electrode that receives the emission signal EM, the data write transistor T2 may include a first electrode that receives the data voltage VDATA, a second electrode connected to the second node N2, and a control electrode that receives the write gate signal GW, the compensation transistor T3 may include a first electrode connected to the third node N3, a second electrode connected to the first node N1, and a control electrode that receives the compensation gate signal GC, a second initialization transistor T4 may include a first electrode that receives the second initialization voltage VINT, a second electrode connected to the third node N3, and a control electrode that receives the initialization gate signal GI, and the light emitting element EE may include an anode electrode connected to the fourth node N4 and a cathode electrode that receives the second power voltage ELVSS.

In an embodiment, the second emission transistor T6 may be a p-type transistor, and the first initialization transistor T7 may be an n-type transistor. In an embodiment, for example, the second emission transistor T6 may be a low temperature poly-silicon (LTPS) thin film transistor. In an embodiment, for example, the first initialization transistor T7 may be an oxide thin film transistor. In such an embodiment, when the second emission transistor T6 is turned on, the first initialization transistor T7 is turned off, and when the second emission transistor T6 is turned off, the first initialization transistor T7 is may be turned on. That is, when the light emitting element EE emits light (i.e., a driving current is applied to the light emitting element EE), the anode electrode of the light emitting element EE may be not initialized (i.e., the first initialization voltage VAINT is not applied to the anode electrode of the light emitting element EE), and when the light emitting element EE does not emit light, the anode electrode of the light emitting device EE may be initialized.

In an embodiment, as shown in FIG. 2, the driving transistor T1, the data write transistor T3, the first emission transistor T5, and the second emission transistor T6 may be p-type transistors. In an embodiment, for example, the driving transistor T1, the data write transistor T3, the first emission transistor T5, and the second emission transistor T6 may be low-temperature polycrystalline silicon thin film transistors. In an embodiment, as shown in FIG. 2, the compensation transistor T3, the first initialization transistor T7, and the second initialization transistor T4 may be oxide thin film transistors. In such an embodiment, a leakage current of the compensation transistor T3, the first initialization transistor T7, and the second initialization transistor T4 may be reduced compared to a case in which the compensation transistor T3, the first initialization transistor T7, and the second initialization transistor T4 are implemented as the low-temperature polycrystalline silicon thin film transistors.

In an embodiment, the driving transistor T1 may further include a lower electrode BML. In an embodiment, for example, a bottom metal layer may be further provided under the driving transistor. In an embodiment, the lower electrode BML may include molybdenum (Mo), but is not limited thereto. In an alternative embodiment, the lower electrode BML may include a low-resistance opaque conductive material such as aluminum (Al), aluminum alloy (Al alloy), tungsten (W), copper (Cu), nickel (Ni), chromium (Cr), titanium (Ti), platinum (Pt), tantalum (Ta), etc.

Figure 3:
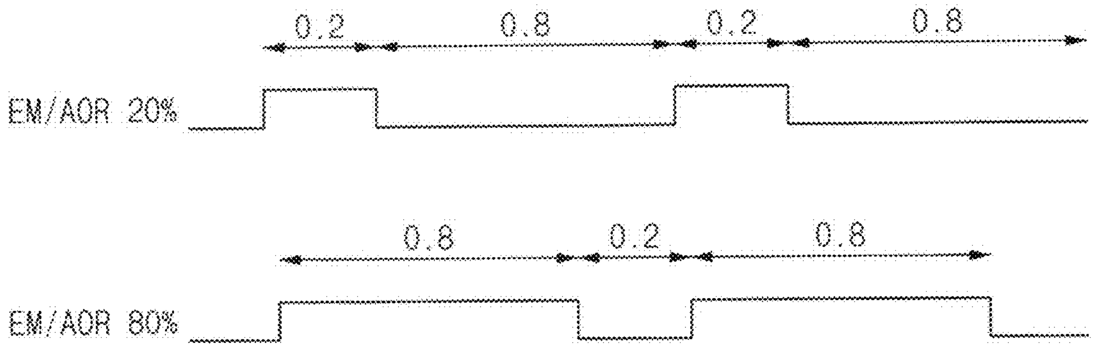
FIG. 3 is a signal timing diagram for explaining an emission off ratio of the display device of FIG. 1.

FIG. 3 is a signal timing diagram for explaining an emission off ratio AOR of the display device 1000 of FIG. 1.

Referring to FIGS. 1 to 3, the pixels P may periodically and repeated perform a light emission and a non-emission. The emission off ratio AOR may be a ratio of a non-emission period in one cycle in which the light emission and the non-emission are repeatedly performed. In an embodiment, for example, an off duty ratio of the emission signal EM may be determined as the emission off ratio AOR.

In an embodiment, for example, the pixels P may emit light when the emission signal EM has a turn-on level, and may not emit light when the emission signal EM has a turn-off level. When the emission off ratio AOR is 20%, the off duty ratio of the emission signal EM may be 20%, and when the emission off ratio AOR is 80%, the off duty ratio of the emission signal EM may be 80%.

Figure 4:
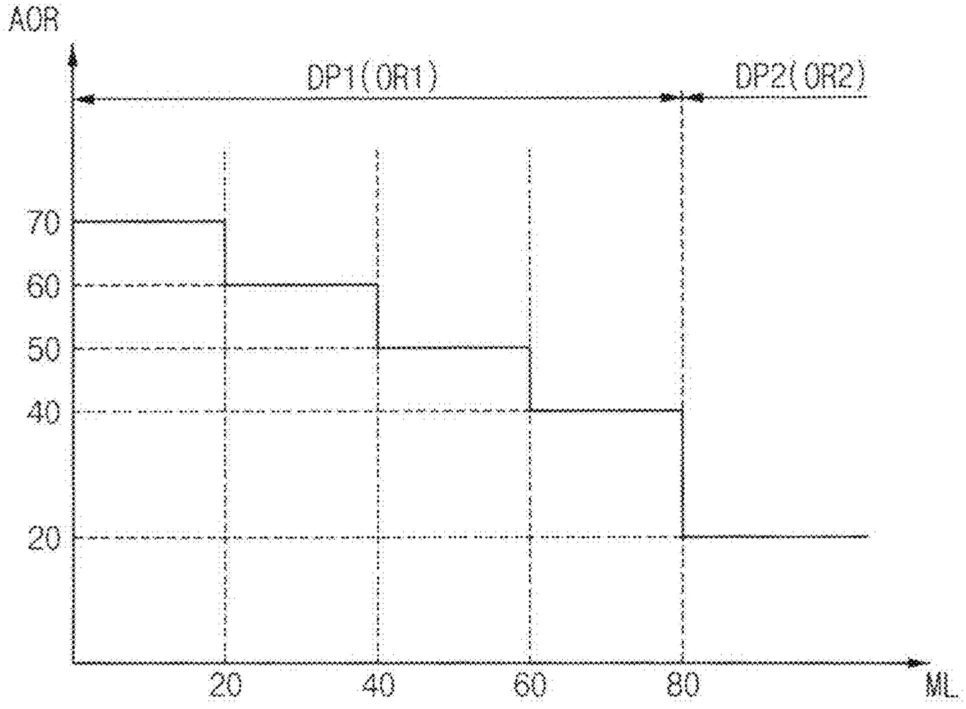
FIG. 4 is a graph illustrating an example of an emission off ratio versus a maximum luminance of the display device of FIG. 1.

FIG. 4 is a graph illustrating an example of an emission off ratio versus the maximum luminance ML of the display device 1000 of FIG. 1.

Referring to FIGS. 1 and 4, the timing controller 200 may determine a first dimming period DP1 and a second dimming period DP2 based on the maximum luminance ML, determine the emission off ratio AOR of the pixels P as a first off ratio OR1 increasing discretely (e.g., in a noncontinuous manner) as the maximum luminance ML decreases in the first dimming period DP1, and determine the emission off ratio AOR as a second off ratio OR2 in the second dimming period DP2. The maximum luminance ML of the first dimming period DP1 may be less than the maximum luminance ML of the second dimming period DP2. The first off ratio OR1 may be greater than or equal to the second off ratio OR2. In an embodiment, the second off ratio OR2 may have a fixed value or be constant during the second dimming period DP2.

In an embodiment, for example, the timing controller 200 may determine a period in which the maximum luminance ML is less than a specific (predetermine or reference) luminance as a low luminance period (e.g., the first dimming period DP1), and determine a period in which the maximum luminance ML is greater than or equal to the specific luminance as a high luminance period (e.g., the second diming period DP2). In an embodiment, since a current deviation due to a low current is more pronounced at low luminance than at high luminance, the timing controller 200 may determine the emission off ratio AOR in the low luminance period as the first off ratio OR1 which is variable. In such an embodiment, the timing controller 200 may not adjust the luminance through the emission off ratio AOR in the high luminance period. Accordingly, the emission off ratio AOR of the high luminance period may be determined as a fixed value. However, since a luminance inversion phenomenon (i.e., a phenomenon in which luminance increases even though the maximum luminance ML is lower) may occur when the first off ratio OR1 is linearly changed, the first off ratio OR1 may increase discretely as the maximum luminance ML decreases.

In an embodiment, for example, the timing controller 200 may determine a period in which the maximum luminance ML is less than 80 cd/$m^2$ (nit) as the first dimming period DP1, and determine a period in which the maximum luminance ML is greater than or equal to 80 nit as the second dimming period DP2. The second off ratio OR2 may have a fixed value of 20%. The first off ratio OR1 may be 70% when the maximum luminance ML is between 0 nit and 20 nit (or in a range of 0 nit to 20 nit), the first off ratio OR1 may be 60% when the maximum luminance ML is between 20 nit and 40 nit, 50% when the maximum luminance ML is between 40 nit and 60 nit, and the first off ratio OR1 may be 40% when the maximum luminance ML is between 60 nit and 80 nit. As such, the first off ratio OR1 may increase discretely.

Here, the maximum luminance ML may be a luminance of an image corresponding to a maximum grayscale value. In an embodiment, for example, the maximum luminance ML may be a luminance of a white image.

Figure 5:
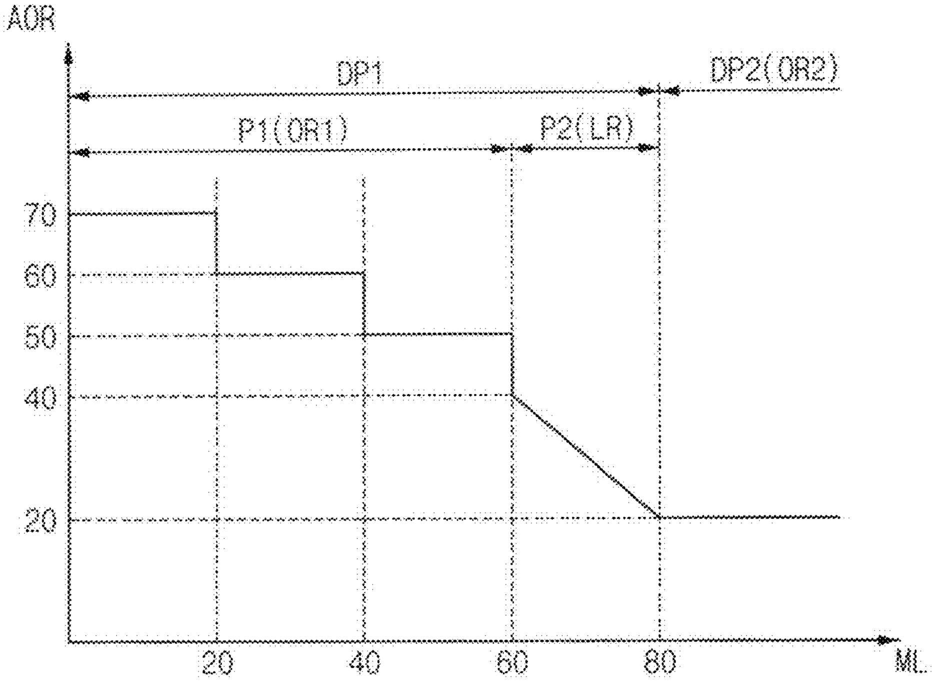
FIG. 5 is a graph illustrating an example of an emission off ratio versus a maximum luminance of a display device according to embodiments of the invention.

FIG. 5 is a graph illustrating an example of the emission off ratio AOR versus the maximum luminance ML of a display device according to embodiments of the invention.

An embodiment of the display device of FIG. 5 is substantially the same as the embodiments of the display device 1000 of FIG. 1 except for the first dimming period DP1. Thus, the same or like reference numerals are used to refer to the same or like elements as those described above, and any repetitive detailed description thereof will be omitted.

Referring to FIGS. 1 and 5, in an embodiment, the timing controller 200 may determine the emission off ratio AOR as the first off ratio OR1 in a first period P1 of the first dimming period DP1, and determine the emission off ratio AOR as a linear off ratio LR increasing linearly as the maximum luminance ML decreases in a second period P2 of the first dimming period DP1. The maximum luminance ML of the first period P1 may be less than the maximum luminance ML of the second period P2. The linear off ratio LR may be less than or equal to the first off ratio OR1 and greater than or equal to the second off ratio OR2.

Since the luminance inversion phenomenon occurs more at low luminance than at high luminance, the timing controller 200 may determine the emission off ratio AOR of the second period P2 having relatively high luminance within the first dimming period DP1 as the linear off ratio LR increasing linearly, and determine the emission off ratio AOR of the first period P1 having relatively low luminance within the first dimming period DP1 as the first off ratio OR1 increasing discretely.

In an embodiment, for example, the timing controller 200 may determine a period in which the maximum luminance ML is less than 80 nit as the first dimming period DP1, determine a period in which the maximum luminance ML is greater than or equal to 80 nit as the second dimming period DP2, determine a period in which the maximum luminance ML is less than 60 nit in the first dimming period DP1 as the first period P1, and determine a period in which the maximum luminance ML is greater than or equal to 60 nit in the first dimming period DP1 as the second period P2. The second off ratio OR2 may have a fixed value of 20%. The first off ratio OR1 may be 70% when the maximum luminance ML is between 0 nit and 20 nit, the first off ratio OR1 may be 60% when the maximum luminance ML is between 20 nit and 40 nit, the first off ratio OR1 may be 50% when the maximum luminance ML is between 40 nit and 60 nit, and the linear off ratio LR may increase from 20% to 40% as the maximum luminance ML decreases. As such, the first off ratio OR1 may increase discretely, and the linear off ratio LR may increase linearly.

Figure 6:
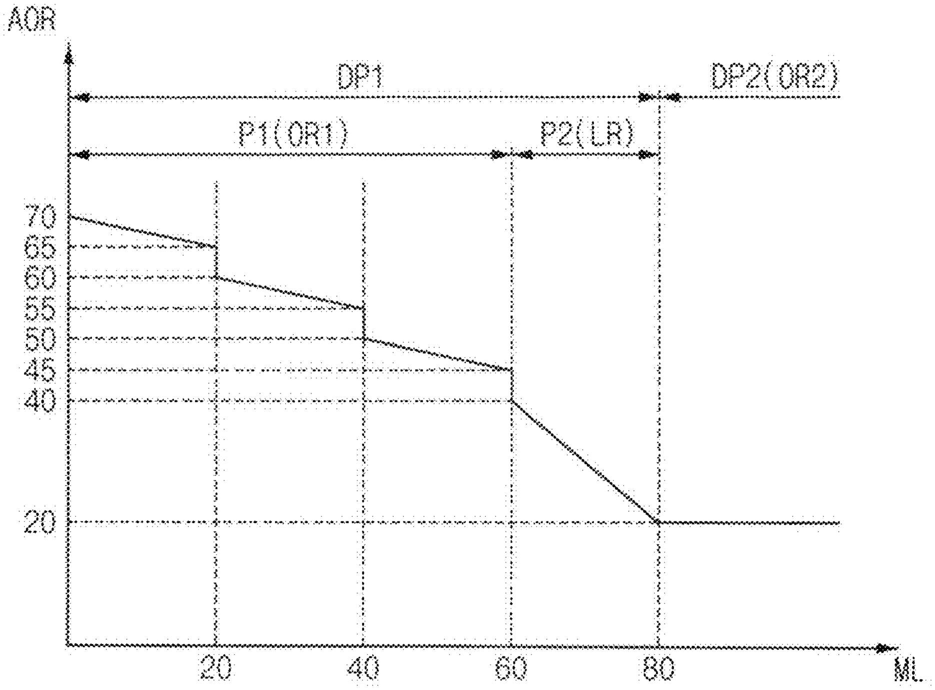
FIG. 6 is a graph illustrating an example of an emission off ratio versus a maximum luminance of a display device according to embodiments of the invention.

FIG. 6 is a graph illustrating an example of the emission off ratio AOR versus the maximum luminance ML of a display device according to embodiments of the invention.

An embodiment of the display device of FIG. 6 is substantially the same as the embodiments of the display device of FIG. 5 except for the first period P1. Thus, the same or like reference numerals are used to refer to the same or like elements as those described above, and any repetitive detailed description thereof will be omitted.

Referring to FIGS. 1 and 6, in an embodiment, the first off ratio OR1 may increase linearly as the maximum luminance ML decreases except for a discretely increasing point. When the first off ratio OR1 increases only discretely as the maximum luminance ML decreases, the emission off ratio AOR may be too large at the discretely increasing point. Accordingly, a portion of the first off ratio OR1 may increase linearly, and other portion may increase discretely.

In an embodiment, for example, the timing controller 200 may determine a period in which the maximum luminance ML is less than 80 nit as the first dimming period DP1, determine a period in which the maximum luminance ML is greater than or equal to 80 nit as the second dimming period DP2, determine a period in which the maximum luminance ML is less than 60 nit in the first dimming period DP1 as the first period P1, and determine a period in which the maximum luminance ML is greater than or equal to 60 nit in the first dimming period DP1 as the second period P2. The second off ratio OR2 may have a fixed value of 20%. The first off ratio OR1 may increase from 65% to 70% as the maximum luminance ML decreases when the maximum luminance ML is between 0 nit and 20 nit, the first off ratio OR1 may increase from 55% to 60% as the maximum luminance ML decreases when the maximum luminance ML is between 20 nit and 40 nit, the first off ratio OR1 may increase from 45% to 50% as the maximum luminance ML decreases when the maximum luminance ML is between 40 nit and 60 nit, and the linear off ratio LR may increase from 20% to 40% as the maximum luminance ML decreases. As such, the first off ratio OR1 may linearly and discretely increase, and the linear off ratio LR may increase linearly.

Figure 7:
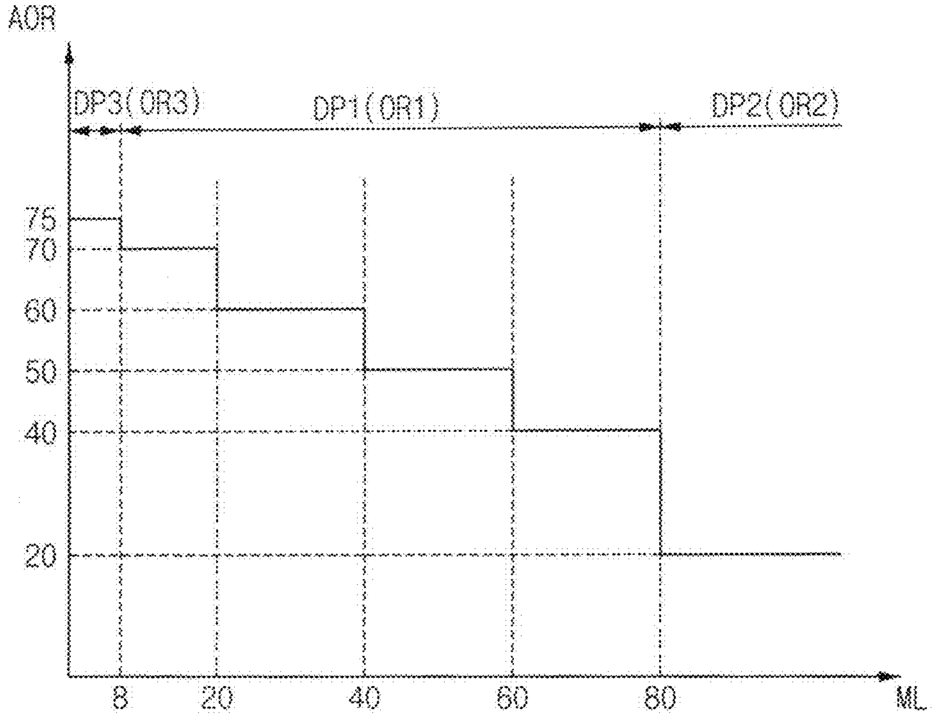
FIG. 7 is a graph illustrating an example of an emission off ratio versus a maximum luminance of a display device according to embodiments of the invention.

FIG. 7 is a graph illustrating an example of the emission off ratio AOR versus the maximum luminance ML of a display device according to embodiments of the invention.

An embodiment of the display device of FIG. 7 is substantially the same as the embodiments of the display device 1000 of FIG. 1 except for the third dimming period DP3. Thus, the same or like reference numerals are used to refer to the same or like elements as those described above, and any repetitive detailed description thereof will be omitted.

Referring to FIGS. 1 and 7, in an embodiment, the timing controller 200 may determine the third dimming period DP3 based on the maximum luminance ML, and determine the emission off ratio AOR as a third off ratio OR3 in the third dimming period DP3. The maximum luminance ML of the third dimming period DP3 may be less than the maximum luminance ML of the first dimming period DP1. The third off ratio OR3 may be greater than or equal to the first off ratio OR1. The third off ratio OR3 may have a fixed value.

In an embodiment, for example, the timing controller 200 may determine a period in which the maximum luminance ML is less than 80 nit and greater than or equal to 8 nit as the first dimming period DP1, determine a period in which the maximum luminance ML is greater than or equal to 80 nit as the second dimming period DP2, and determine a period in which the maximum luminance ML is less than 8 nit as the third dimming period DP3. The second off ratio OR2 may have a fixed value of 20%. The first off ratio OR1 may be 70% when the maximum luminance ML is between 8 nit and 20 nit, the first off ratio OR1 may be 60% when the maximum luminance ML is between 20 nit and 40 nit, the first off ratio OR1 may be 50% when the maximum luminance ML is between 40 nit and 60 nit, and the first off ratio OR1 may be 40% when the maximum luminance ML is between 60 nit and 80 nit. The third off ratio OR3 may have a fixed value of 75%. As such, the first off ratio OR1 may increase discretely.

Figure 8:
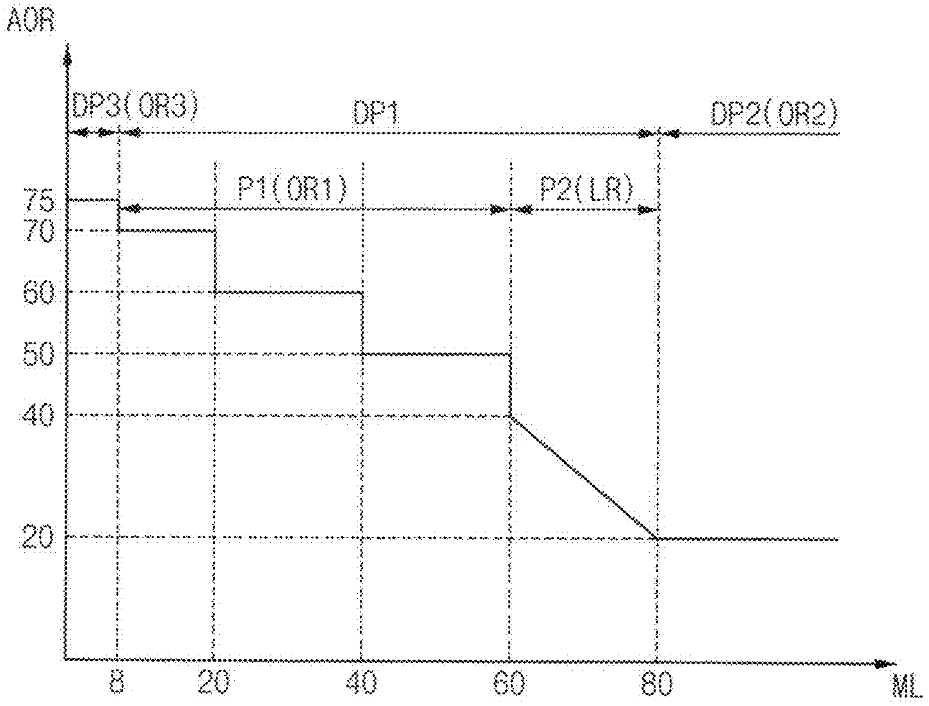
FIG. 8 is a graph illustrating an example of an emission off ratio versus a maximum luminance of a display device according to embodiments of the invention.

FIG. 8 is a graph illustrating an example of the emission off ratio AOR versus the maximum luminance ML of a display device according to embodiments of the invention.

An embodiment of the display device of FIG. 8 is substantially the same as the embodiments of the display device of FIG. 5 except for the third dimming period DP3. Thus, the same or like reference numerals are used to refer to the same or like elements as those described above, and any repetitive detailed description thereof will be omitted.

Referring to FIGS. 1 and 8, in an embodiment, the timing controller 200 may determine the third dimming period DP3 based on the maximum luminance ML, and determine the emission off ratio AOR as the third off ratio OR3 in the third dimming period DP3. The maximum luminance ML of the third dimming period DP3 may be less than the maximum luminance ML of the first dimming period DP1. The third off ratio OR3 may be greater than or equal to the first off ratio OR1. The third off ratio OR3 may have a fixed value.

In an embodiment, for example, the timing controller 200 may determine a period in which the maximum luminance ML is less than 80 nit and greater than or equal to 8 nit as the first dimming period DP1, determine a period in which the maximum luminance ML is greater than or equal to 80 nit as the second dimming period DP2, and determine a period in which the maximum luminance ML is less than 8 nit as the third dimming period DP3. The second off ratio OR2 may have a fixed value of 20%. The first off ratio OR1 may be 70% when the maximum luminance ML is between 8 nit and 20 nit, the first off ratio OR1 may be 60% when the maximum luminance ML is between 20 nit and 40 nit, the first off ratio OR1 may be 50% when the maximum luminance ML is between 40 nit and 60 nit, the linear off ratio LR may increase from 20% to 40% as the maximum luminance ML decreases, and the third off ratio OR3 may have a fixed value of 75%. As such, the first off ratio OR1 may increase discretely, and the linear off ratio LR may increase linearly.

Figure 9:
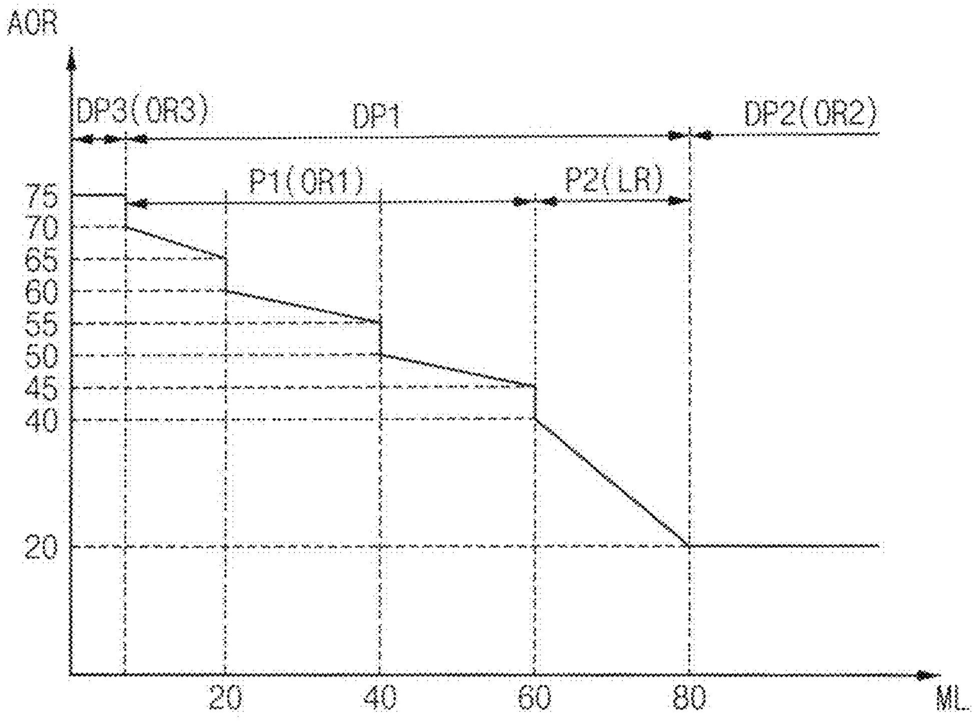
FIG. 9 is a graph illustrating an example of an emission off ratio versus a maximum luminance of a display device according to embodiments of the invention.

FIG. 9 is a graph illustrating an example of the emission off ratio AOR versus the maximum luminance ML of a display device according to embodiments of the invention.

An embodiment of the display device of FIG. 9 is substantially the same as the embodiments of the display device of FIG. 5 except for the third dimming period DP3. Thus, the same or like reference numerals are used to refer to the same or like elements as those described above, and any repetitive detailed description thereof will be omitted.

Referring to FIGS. 1 and 9, in an embodiment, the timing controller 200 may determine the third dimming period DP3 based on the maximum luminance ML, and determine the emission off ratio AOR as the third off ratio OR3 in the third dimming period DP3. The maximum luminance ML of the third dimming period DP3 may be less than the maximum luminance ML of the first dimming period DP1. The third off ratio OR3 may be greater than or equal to the first off ratio OR1. The third off ratio OR3 may have a fixed value.

In an embodiment, for example, the timing controller 200 may determine a period in which the maximum luminance ML is less than 80 nit and greater than or equal to 8 nit as the first dimming period DP1, determine a period in which the maximum luminance ML is greater than or equal to 80 nit as the second dimming period DP2, and determine a period in which the maximum luminance ML is less than 8 nit as the third dimming period DP3. The second off ratio OR2 may have a fixed value of 20%. The first off ratio OR1 may increase from 65% to 70% as the maximum luminance ML decreases when the maximum luminance ML is between 8 nit and 20 nit, the first off ratio OR1 may increase from 55% to 60% as the maximum luminance ML decreases when the maximum luminance ML is between 20 nit and nit, the first off ratio OR1 may increase from 45% to 50% as the maximum luminance ML decreases when the maximum luminance ML is between 40 nit and 60 nit, the linear off ratio LR may increase from 20% to 40% as the maximum luminance ML decreases, and the third off ratio OR3 may have a fixed value of 75%. As such, the first off ratio OR1 may linearly and discretely increase, and the linear off ratio LR may increase linearly.

Figure 10:
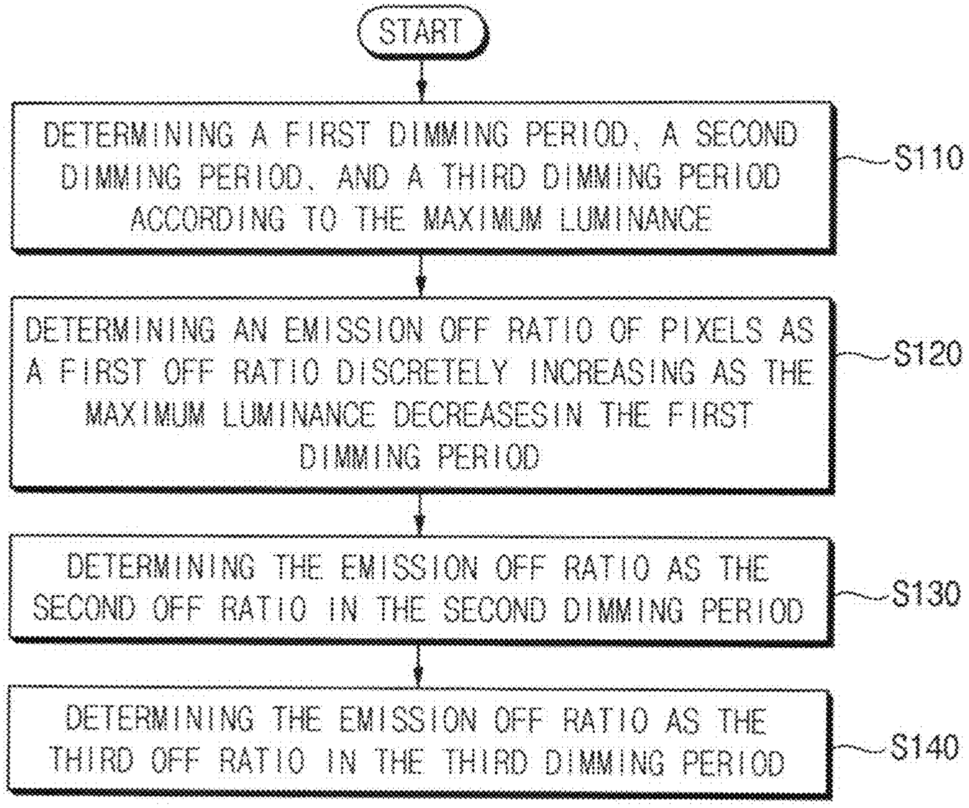
FIG. 10 is a flowchart illustrating a method of driving a display device according to embodiments of the invention.

FIG. 10 is a flowchart illustrating a method of driving a display device according to embodiments of the invention.

Referring to FIG. 10, an embodiment of the method of driving a display device may determine the first dimming period, the second dimming period, and the third dimming period based on the maximum luminance (S110), determining the emission off ratio of the pixels as the first off ratio increasing discretely as the maximum luminance decreases in the first dimming period (S120), determining the emission off ratio as the second off ratio in the second dimming period (S130), and determining the emission off ratio as the third off ratio in the third dimming period (S140).

In an embodiment, the maximum luminance of the first dimming period may be less than the maximum luminance of the second dimming period, and the maximum luminance of the third dimming period may be less than the maximum luminance of the first dimming period.

In an embodiment, the emission off ratio may be determined as the first off ratio in the first period of the first dimming period, and the emission off ratio may be determined as the linear off ratio increasing linearly as the maximum luminance decreases in the second period of the first dimming period. The maximum luminance of the first period may be less than the maximum luminance of the second period. The linear off ratio may be less than or equal to the first off ratio and greater than or equal to the second off ratio.

Figure 11:
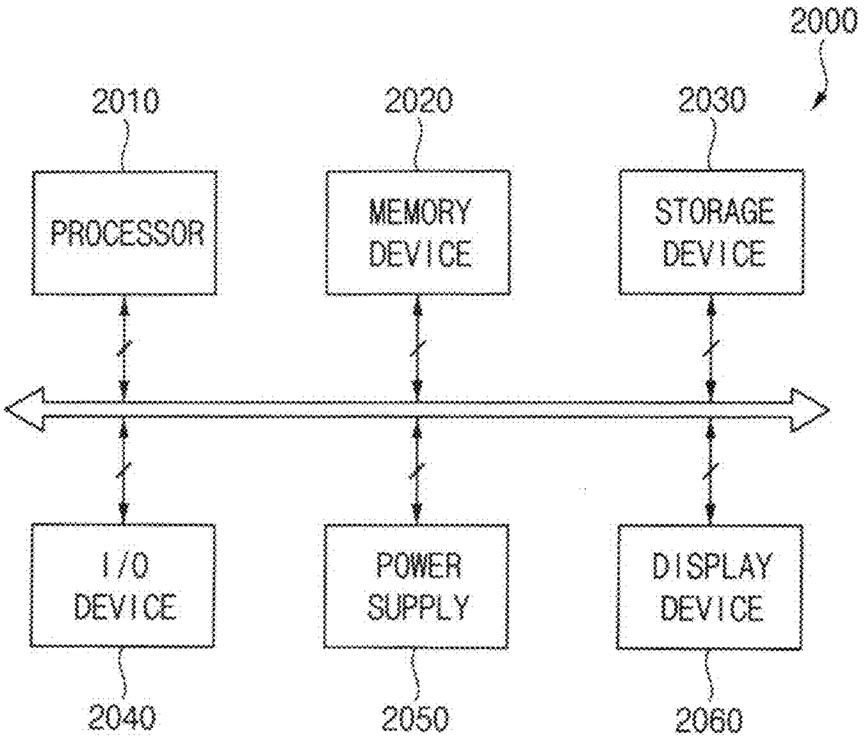
FIG. 11 is a block diagram showing an electronic device according to embodiments of the invention.
Figure 12:
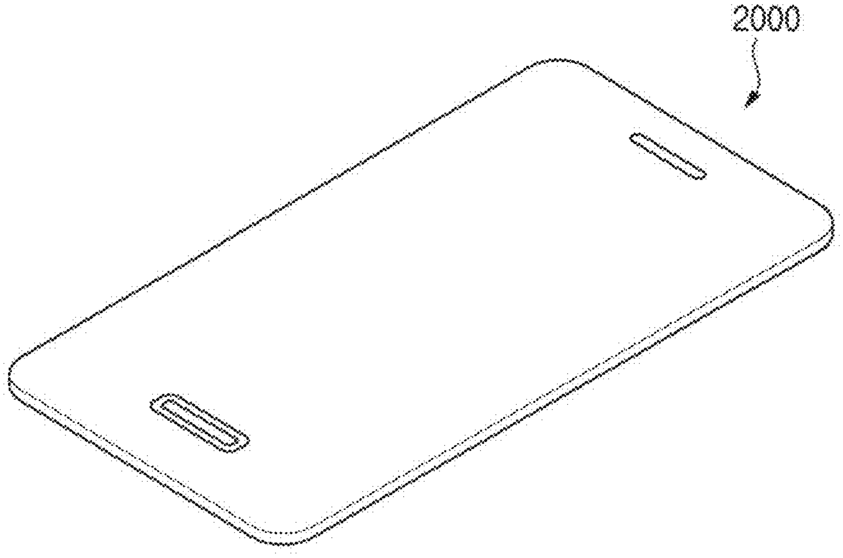
FIG. 12 is a diagram showing an example in which the electronic device of FIG. 11 is implemented as a smart phone.

FIG. 11 is a block diagram showing an electronic device according to embodiments of the invention, and FIG. 12 is a diagram showing an example in which the electronic device of FIG. 11 is implemented as a smart phone.

Referring to FIGS. 11 and 12, an embodiment of the electronic device 2000 may include a processor 2010, a memory device 2020, a storage device 2030, an input/output (I/O) device 2040, a power supply 2050, and a display device 2060. Here, the display device 2060 may be the display device 1000 of FIG. 1. In addition, the electronic device 2000 may further include a plurality of ports for communicating with a video card, a sound card, a memory card, a universal serial bus (USB) device, other electronic devices, etc. In an embodiment, as shown in FIG. 12, the electronic device 2000 may be implemented as a smart phone. However, the electronic device 2000 is not limited thereto. In an alternative embodiment, for example, the electronic device 2000 may be implemented as a cellular phone, a video phone, a smart pad, a smart watch, a tablet personal computer (PC), a car navigation system, a computer monitor, a laptop, a head mounted display (HMD) device, etc.

The processor 2010 may perform various computing functions. The processor 2010 may be a micro-processor, a central processing unit (CPU), an application processor (AP), etc. The processor 2010 may be coupled to other components via an address bus, a control bus, a data bus, etc.

Further, the processor 2010 may be coupled to an extended bus such as a peripheral component interconnection (PCI) bus.

The memory device 2020 may store data for operations of the electronic device 2000. In an embodiment, for example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc., and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. In an embodiment, for example, the display device 2060 may be an organic light emitting display device or a quantum dot light emitting display device, but is not limited thereto. The display device 2060 may be coupled to other components via the buses or other communication links. Here, the display device 2060 may reduce luminance inversion occurring in a variable period (e.g., the first dimming period) of the emission off ratio by discretely adjusting the emission off ratio.

In an embodiment, the display device 2060 may include a display panel including pixels, and a timing controller configured to determine a first dimming period and a second dimming period based on a maximum luminance, to determine an emission off ratio of the pixels as a first off ratio increasing discretely as the maximum luminance decreases in the first dimming period, and to determine the emission off ratio as a second off ratio in the second dimming period. Since the display device 2060 is substantially the same as those described above with reference to FIGS. 1 to 10, any repetitive detailed description thereof will be omitted.

Embodiments of the invention may be applied to any electronic device including the display device. In an embodiment, for example, the inventions may be applied to a television (TV), a digital TV, a three-dimensional (3D) TV, a mobile phone, a smart phone, a tablet computer, a virtual reality (VR) device, a wearable electronic device, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including pixels; and a timing controller which determines a first dimming period and a second dimming period based on a maximum luminance, determines an emission off ratio of the pixels as a first off ratio increasing discretely as the maximum luminance decreases in the first dimming period, and to determine the emission off ratio as a second off ratio in the second dimming period, wherein the emission off ratio increases discretely to a plurality of different levels at a plurality of discretely increasing points while the maximum luminance remains the same between contiguous discretely increasing points of the plurality of discretely increasing points during the first dimming period.

2. The display device of claim 1, wherein the maximum luminance of the first dimming period is less than the maximum luminance of the second dimming period.

3. The display device of claim 2, wherein the first off ratio is greater than or equal to the second off ratio.

4. The display device of claim 2, wherein the second off ratio has a fixed value.

5. The display device of claim 1, wherein the timing controller determines the emission off ratio as the first off ratio in a first period of the first dimming period, and determines the emission off ratio as a linear off ratio increasing linearly as the maximum luminance decreases in a second period of the first dimming period.

6. The display device of claim 5, wherein the maximum luminance of the first period is less than the maximum luminance of the second period.

7. The display device of claim 6, wherein the linear off ratio is less than or equal to the first off ratio and greater than or equal to the second off ratio.

8. The display device of claim 1, wherein the first off ratio increases linearly as the maximum luminance decreases except for the discretely increasing point.

9. The display device of claim 1, wherein each of the pixels comprises:

a light emitting element;

a driving transistor which generates a driving current;

a first emission transistor which applies a first power voltage to the driving transistor in response to an emission signal;

a second emission transistor which applies the driving current to the light emitting element in response to the emission signal;

a first initialization transistor which applies a first initialization voltage to an anode electrode of the light emitting element in response to the emission signal;

a data write transistor which applies a data voltage to the driving transistor in response to a write gate signal;

a compensation transistor which connects a first electrode of the driving transistor and a control electrode of the driving transistor to each other in response to a compensation gate signal;

a second initialization transistor which applies a second initialization voltage to the control electrode of the driving transistor in response to an initialization gate signal;

a storage capacitor including a first electrode connected to the control electrode of the driving transistor and a second electrode which receives the first power voltage; and a boost capacitor including a first electrode which receives the write gate signal and a second electrode connected to the control electrode of the driving transistor.

10. The display device of claim 9, wherein an off duty ratio of the emission signal is determined as the emission off ratio.

11. The display device of claim 1, wherein the timing controller determines a third dimming period based on the maximum luminance, and determines the emission off ratio as a third off ratio in the third dimming period.

12. The display device of claim 11, wherein the maximum luminance of the third dimming period is less than the maximum luminance of the first dimming period.

13. The display device of claim 12, wherein the third off ratio is greater than or equal to the first off ratio.

14. The display device of claim 11, wherein the third off ratio has a fixed value.

15. A method of driving a display device, the method comprising:

determining a first dimming period, a second dimming period, and a third dimming period based on a maximum luminance;

determining an emission off ratio of pixels as a first off ratio increasing discretely as the maximum luminance decreases in the first dimming period;

determining the emission off ratio as a second off ratio in the second dimming period; and determining the emission off ratio as a third off ratio in the third dimming period, wherein the emission off ratio increases discretely to a plurality of different levels at a plurality of discretely increasing points during the first dimming period while the maximum luminance remains the same between contiguous discretely increasing points of the plurality of discretely increasing points.

16. The method of claim 15, wherein the maximum luminance of the first dimming period is less than the maximum luminance of the second dimming period, and wherein the maximum luminance of the third dimming period is less than the maximum luminance of the first dimming period.

17. The method of claim 16, wherein the first off ratio is greater than or equal to the second off ratio, and wherein the third off ratio is greater than or equal to the first off ratio.

18. The method of claim 15, wherein determining the emission off ratio in the first dimming period comprises:

determining the emission off ratio as the first off ratio in a first period of the first dimming period; and determining the emission off ratio as a linear off ratio increasing linearly as the maximum luminance decreases in a second period of the first dimming period.

19. The method of claim 18, wherein the maximum luminance of the first period is less than the maximum luminance of the second period.

20. The method of claim 19, wherein the linear off ratio is less than or equal to the first off ratio and greater than or equal to the second off ratio.

* * * * *